July 8, 1947.　　　　G. SLOWIG　　　　2,423,568
SHAFT COUPLING
Filed Dec. 6, 1943
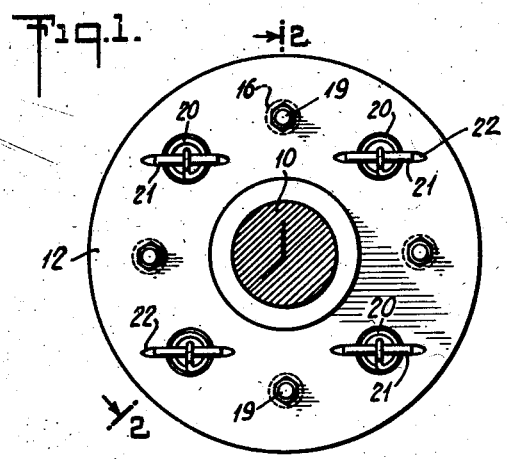
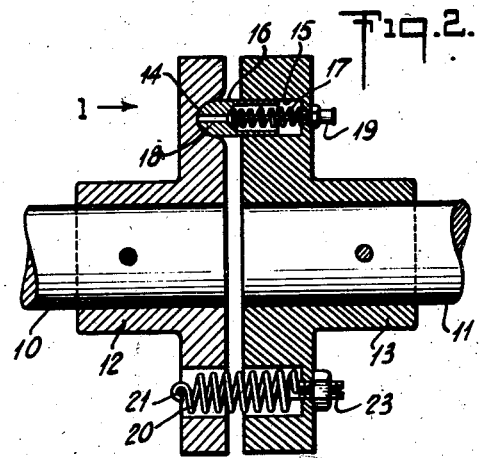
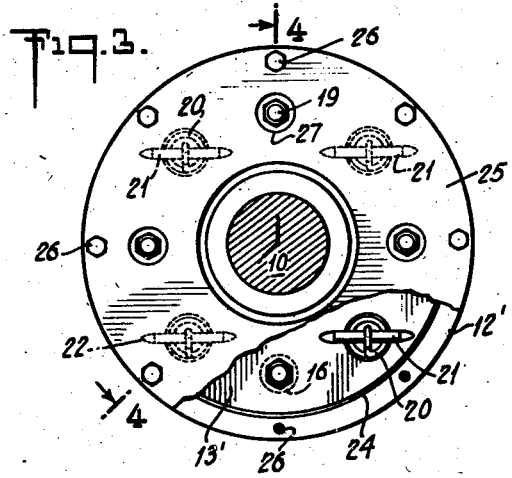
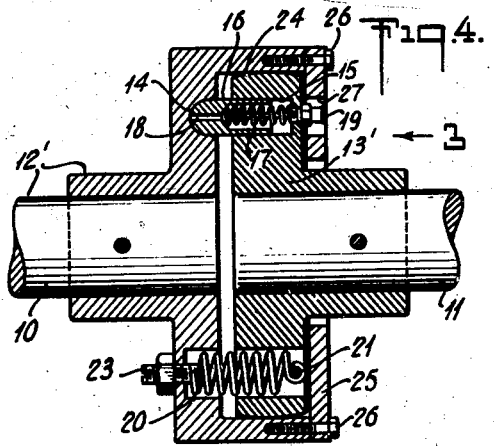
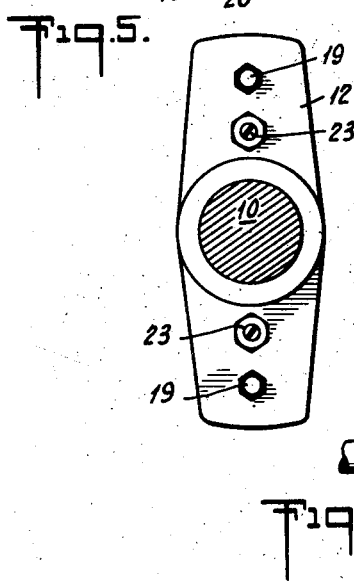
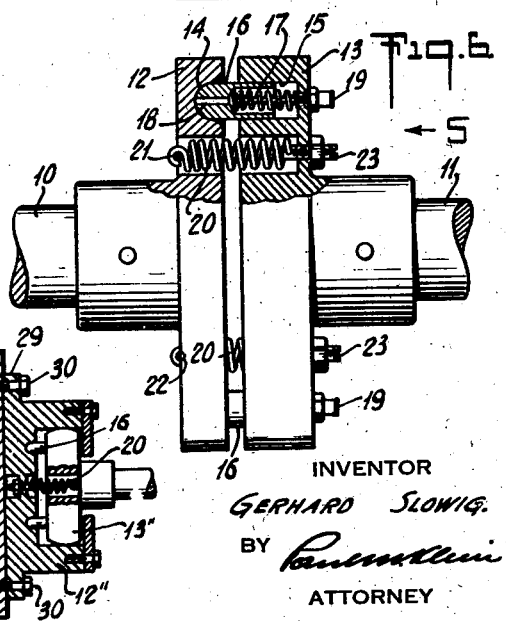
INVENTOR
GERHARD SLOWIG.
BY
ATTORNEY Patented July 8, 1947

2,423,568

UNITED STATES PATENT OFFICE 2,423,568

SHAFT COUPLING

Gerhard Slowig, Astoria, N. Y.

Application December 6, 1943, Serial No. 513,007

6 Claims. (Cl. 64—20)

This invention relates to shaft couplings in general and particularly to what may be called flexible couplings adopted to join two shafts which may not be truly aligned.

One of the principal objects of the present invention is to provide a relatively simple, sturdy, inexpensive shaft coupling, wherein power-transmitting means are employed which connect the driving and driven members of the coupling in such a way as to facilitate the operation of the two members at any angular relation to one another, within certain practical limits.

Another object of this invention is to provide in a flexible shaft coupling power-transmitting elements comprising substantially cylindrical bodies, one end of which bodies being substantially semi-spherically rounded for engagement of the corresponding sockets in one of the coupling members, the cylindrical portion of the elements being hollow for the reception of a spring or other means for normally urging the rounded ends of the elements into said sockets, and wherein said elements are provided with means for facilitating the lubrication of the rounded ends within the sockets.

The foregoing and numerous other important objects and advantages of the present invention will become more fully apparent from the ensuing description, in connection with the accompanying drawing, which latter, although illustrating only a few specific forms of my invention, is by no means intended to restrict the latter to the actual showing, and in which:

Figure 1 is an end view of one form of my device;

Figure 2 is a cross-sectional view through that form of my device, taken on lines 2—2 of Figure 1;

Figure 3 is an end view of a modified form of my device;

Figure 4 is a cross-sectional view taken on lines 4—4 of Figure 3;

Figure 5 is an end view of another modified form of my device;

Figure 6 is an elevation, partly in section, of the modified form shown in Figure 5; and Figure 7 is still another embodiment of my shaft coupling, as employed in connection with flywheels.

Referring now specifically to the figures, numerals 10 and 11 denote shafts, to the ends of which are secured by any suitable means coupling members 12 and 13, of which one is a driving and the other a driven member. In member 12 there are provided what may be considered semi-spherical sockets 14, while opposite the sockets are arranged recesses 15 in member 13. Within these recesses are operatively lodged power-transmitting elements 16, which are preferably of cylindrical shapes. Their bodies are hollow for the reception of a spring member 17, one end of which latter bears against the end wall of recess 15.

The outer body end of the power-transmitting element is rounded to substantially a semi-sphere for engagement with socket 14 of member 12.

I preferably provide a central passage 18 through the rounded end of element 16 for admitting lubricant between the surfaces of the element and its socket. To facilitate lubrication, I provide in the end wall of recess 15 a lubricating cup or equivalent means indicated at 19. I employ at least two power-transmitting elements for connecting the driving and driven members of the coupling, depending upon the size of the device. Any number of such elements may be employed.

In order to continually, but yieldably urge the two coupling members against one another, I provide suitable tension means, illustrated in the different figures in the form of springs 20. These springs are preferably lodged in suitable recesses and are held at one end by pins 21, kept against rotation or movement in corresponding grooves 22, while their other ends are preferably connected with an adjusting screw 23, by means of which the tension of the springs may be varied.

The simplest form of my device is shown in Figures 5 and 6 wherein coupling members 120 and 130, instead of being disc-shaped as in Figures 1 and 2, are oblong in their form. In the embodiments shown in Figures 1 and 3, springs 20 are arranged between the power-transmitting elements so that they alternate with the latter. In Figures 5 and 6, these springs are aligned with the power-transmitting elements.

Referring now to Figures 3 and 4, in this embodiment member 12' becomes an outer member of the coupling while member 13' constitutes the inner member thereof. The outer periphery of the inner member is spherically curved at 24, so as to facilitate its movement within the outer member. In order to prevent dust or other foreign matter from entering the coupling interior, I preferably provide, as part of the outer member, a cover 25, which is removably secured by bolts 26 or other suitable means. It will be observed that cover 25 is provided with openings 27 for accommodating lubricating cups 19 of the power-transmitting elements.

Another embodiment of my invention is illustrated in Figure 7, especially adapted for attachment to a flywheel of an engine or the like. Shaft 10' of an engine carries a flywheel 28, and to that flywheel is secured one of the coupling members 12", by means of an annular flange 29, forming a part of that member. This flange is attached by bolt 30 or any other suitable means to flywheel 28. The interior arrangement of this coupling device, composed of outer member 12" and inner member 13" is very similar to that described in connection with Figures 3 and 4.

Operation

The operation of the device is very simple. In mounting the device onto two shafts to be coupled, the two coupling members are first placed upon the respective shafts with springs 20 removed. When elements 16 are properly aligned with their respective sockets 14, the springs 20 are placed into position and are tightened by means of screws 23 and their nuts. The device is now ready for operation.

It is advisable to first ascertain whether or not the two coupling members are under sufficient tension to prevent slipping-out of elements 16 from their respective sockets. In the event the tendency of disengagement exists, springs 20 are adjusted for greater tension until slipping-out of elements 16 from their sockets 14 is prevented. When the springs are thus adjusted, the device is lubricated by means of cups 19, and is ready for operation.

In the modified form shown in Figures 3, 4 and 7, lubricant may be placed into the interior of the outer member, in addition to the individual lubrication of the power-transmitting elements.

It will be observed in all figures that sockets 14 comprise a substantially semi-spherical portion terminating in a flared mouth, which serves not only for the purpose of facilitating the insertion of the spherical end of elements 16, but also is instrumental in more securely holding these elements in their respective sockets.

While I have shown and described specific forms of my device, be it understood that changes and improvements may be readily incorporated by those skilled in the art, and I therefore reserve for myself the right to make such changes and improvements without departing from the broad scope of my invention, as expressed in the annexed claims.

I claim:

1. In a shaft coupling, driving and driven members, substantially semi-spherical sockets in one member, recesses in the other member, power-transmitting elements with substantially semi-spherical ends operative in said recesses and lodged with their spherical ends in the spherical sockets, means for normally urging said elements into said sockets, and resilient means for connecting and tensionally urging said members toward one another.

2. In a shaft coupling as per claim 1, said power-transmitting elements comprising substantially cylindrical hollow bodies extending from their semi-spherical ends, said means for normally urging said elements into said sockets being lodged in the hollow body portion of the elements, the outer ends of the said means bearing against the end walls of the recesses.

3. In a shaft coupling, driving and driven inner and outer members in substantially telescoping relation to each other, substantially semi-spherical sockets in one member, recesses in the other member, hollow power-transmitting elements in said recesses and having substantially semi-spherical ends lodged in said semi-spherical sockets, resilient means lodged within and adapted to individually urge said elements into the sockets, resilient adjustable connecting means for said members for tensionally urging them toward one another, a removable cover for the inner member associated with the outer member, and lubricating means for said power-transmitting elements adapted to direct lubricant to said sockets, said cover having apertures for accommodating and rendering accessible said lubricating means.

4. In a shaft coupling as per claim 5, said inner member having a curved outer periphery to facilitate its movement within the outer member.

5. In a shaft coupling, outer and inner driving and driven members, the outer member having means for attaching it to a rotary device and a recess for the reception of the inner member, and being provided with a cover partially closing said recess and extending over said inner member, spring-biased power-transmitting elements associated with and operatively connecting said members, adjustable resilient means connecting and urging said members toward each other, and lubricating means provided for said elements, and being rendered accessible through apertures provided in the cover, said power-transmitting elements being adjustably mounted in one of the members and engaging sockets provided in the other member.

6. In a shaft coupling, driving and driven members, power-transmitting elements in engagement with both members, adjustable resilient connecting means passing through and normally urging said members toward each other, said elements comprising substantially cylindrical bodies having rounded ends for engagement with similarly shaped sockets in one of the members, their cylindrical bodies being movably lodged in the other member, and resilient means within the hollow bodies of said elements for urging their rounded ends into the sockets.

GERHARD SLOWIG.

REFERENCES CITED

The following references are of record in the file of this patent:

UNITED STATES PATENTS

| Number | Name | Date |
|---|---|---|
| 1,707,530 | Meseroll | Apr. 2, 1929 |
| 1,956,733 | Small | May 1, 1934 |
| 990,757 | Leoni | Apr. 25, 1911 |
| 1,657,274 | Niedhammer | Jan. 24, 1928 |
| 1,675,065 | Thomas | June 26, 1928 |
| 2,072,843 | Stack | Mar. 2, 1937 |

FOREIGN PATENTS

| Number | Country | Date |
|---|---|---|
| 37,763 | France | Oct. 28, 1930 |
| 127,842 | Switzerland | Sept. 17, 1928 |